(12) United States Patent
Kouno

(10) Patent No.: US 8,231,468 B2
(45) Date of Patent: Jul. 31, 2012

(54) GAME CONTROL PROGRAM, GAME MACHINE, AND GAME CONTROL METHOD

(75) Inventor: Tsutomu Kouno, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 924 days.

(21) Appl. No.: 12/065,889

(22) PCT Filed: May 1, 2006

(86) PCT No.: PCT/JP2006/309105
§ 371 (c)(1),
(2), (4) Date: Nov. 19, 2008

(87) PCT Pub. No.: WO2007/032122
PCT Pub. Date: Mar. 22, 2007

(65) Prior Publication Data
US 2009/0104992 A1    Apr. 23, 2009

(30) Foreign Application Priority Data

Sep. 15, 2005    (JP) .................................. 2005-269245

(51) Int. Cl.
*A63F 13/02*    (2006.01)
*G06F 19/00*    (2011.01)

(52) U.S. Cl. .............. 463/36; 463/38; 463/43; 273/108; 273/109; 273/110

(58) Field of Classification Search .................... 463/36, 463/38, 43; 273/108, 109, 110
See application file for complete search history.

(56) References Cited

U.S. PATENT DOCUMENTS

| | | | | |
|---|---|---|---|---|
| 5,050,883 A | * | 9/1991 | Goldfarb et al. ................ | 463/15 |
| 5,066,014 A | * | 11/1991 | Dobson ......................... | 273/110 |
| 5,213,325 A | * | 5/1993 | Malavazos et al. ........... | 273/110 |
| 5,910,797 A | * | 6/1999 | Beuk ............................ | 345/157 |

(Continued)

FOREIGN PATENT DOCUMENTS

JP    2000-185175 A    7/2000

(Continued)

OTHER PUBLICATIONS

Super Mario Brothers Game Manual for Nintendo Entertainment System, published by Nintendo on or before Dec. 31, 1985, 18 pages.*

(Continued)

*Primary Examiner* — Dmitry Suhol
*Assistant Examiner* — Jason Skaarup
(74) *Attorney, Agent, or Firm* — Fitch, Even, Tabin & Flannery, LLP

(57) ABSTRACT

The present invention provides a game device with enhanced entertainment capabilities.

In a game device, a slope controller controls the inclination of the ground on which a character is placed, based on an operation instruction input by a player via a controller. An independent mode controller controls the character so that the character performs an action determined by an artificial intelligence unit, when the inclination of the ground is smaller than a certain value. A dependent mode controller controls the character so that the character rolls on the ground, when the inclination of the ground is greater than a certain value. The player tilts the ground to roll the character in a desired direction so as to lead the character to the goal.

4 Claims, 4 Drawing Sheets

U.S. PATENT DOCUMENTS

| | | | |
|---|---|---|---|
| 6,322,448 B1* | 11/2001 | Kaku et al. | 463/32 |
| 6,375,572 B1* | 4/2002 | Masuyama et al. | 463/43 |
| 7,601,066 B1* | 10/2009 | Masuyama et al. | 463/38 |
| 2001/0007542 A1* | 7/2001 | Fukuda | 369/24 |
| 2003/0236111 A1* | 12/2003 | Otani et al. | 463/8 |
| 2004/0029640 A1* | 2/2004 | Masuyama et al. | 463/43 |
| 2004/0041788 A1* | 3/2004 | Ternullo | 345/158 |
| 2006/0044311 A1* | 3/2006 | Dohta | 345/441 |

FOREIGN PATENT DOCUMENTS

| | | |
|---|---|---|
| JP | 2001-170358 | 6/2001 |
| JP | 2002-216161 A | 8/2002 |
| JP | 2003-169962 | 6/2003 |
| JP | 2004-024360 A | 1/2004 |
| JP | 2004-195166 A | 7/2004 |
| WO | WO 97/46295 A | 12/2000 |

OTHER PUBLICATIONS

Super Mario Brothers World 1-2 Map, retreived from <http://www.nesmaps.com/maps/SuperMarioBrothers/SuperMarioBrosWorld1-2Map.html> on Dec. 10, 2011, 1 page.*

Katamari Damacy Game Manual for Playstation 2, published by Namco on or before Dec. 31, 2003, 18 pages.*

Super Mario Brothers 3 Game Manual for Nintendo Entertainment System, published by Nintendo on or before Dec. 31, 1990, 42 pages.*

Kudoh, Susumu; Fighting Studio; "GameBoy Kanpekikouryaku Series 42, Korokoro Kirby Hishoukouryakuho"; Futabasha Publishers, Ltd.; Oct. 20, 2000; pp. 10-12.

Patent Cooperation Treaty, International Preliminary Report on Patentability issued in corresponding International Application No. PCT/JP2006/309105 on Mar. 18, 2008; 1 page (in English language).

Patent Cooperation Treaty, International Search Report issued in corresponding International Application No. PCT/JP2006/309105 on Aug. 1, 2006; 2 pages and 2 page English-language translation.

Patent Cooperation Treaty, Written Opinion of the International Searching Authority issued in corresponding International Application No. PCT/JP2006/309105 on Aug. 1, 2006; 4 pages and 4 page English-language translation.

Japanese Patent Office, Notification of Reason(s) for Refusal issued in corresponding Japanese Patent Application No. 2005-269245 on Mar. 4, 2008; 5 pages and 3 page English-language translation.

Japan Patent Office; "Notice of Reason(s) for Refusal" issued in corresponding Japanese Application No. 2005-269245; dated Jul. 8, 2008; 4 pages (includes 2 pages partial English Translation).

Japan Patent Office; "Questioning—Report of Reconsideration" issued in corresponding Japanese Application No. 2005-269245; dated Mar. 2, 2010; 5 pages (includes 2 pages partial English Translation).

* cited by examiner

GAME CONTROL PROGRAM, GAME MACHINE, AND GAME CONTROL METHOD

TECHNICAL FIELD

The present invention relates to a game control technique, particularly to a game device, a method, and a program product for controlling a game in which a character is moved and led to the goal.

BACKGROUND ART

Formerly, an arcade game was popular in which a coin such as a 10-yen coin was inserted into the game machine so as to be moved along the rail and led to the goal. In this game, the player manipulates the rail with the coin placed thereon. The player tilts the rail to roll the coin to the goal, while taking care not to drop the coin from the rail.

DISCLOSURE OF THE INVENTION

Problem to be Solved by the Invention

The inventor has improved such game system, and has conceived of a technique for creating an advanced game with enhanced entertainment capabilities. The present invention has been made in view of such a situation, and a general purpose thereof is to provide a technique for achieving a game device with enhanced entertainment capabilities.

Means for Solving the Problem

To solve the problem above, a game device of an embodiment of the present invention comprises: an artificial intelligence unit which controls an action of a character; a user interface which receives an operation input for tilting the ground on which the character is placed; a slope controller which controls the slope of the ground based upon the operation input that the user interface has received; and a character controller which moves the character based upon the inclination of the ground controlled by the slope controller.

Advantageous Effects

The present invention provides a technique for achieving a game device with enhanced entertainment capabilities.

Figure 1:
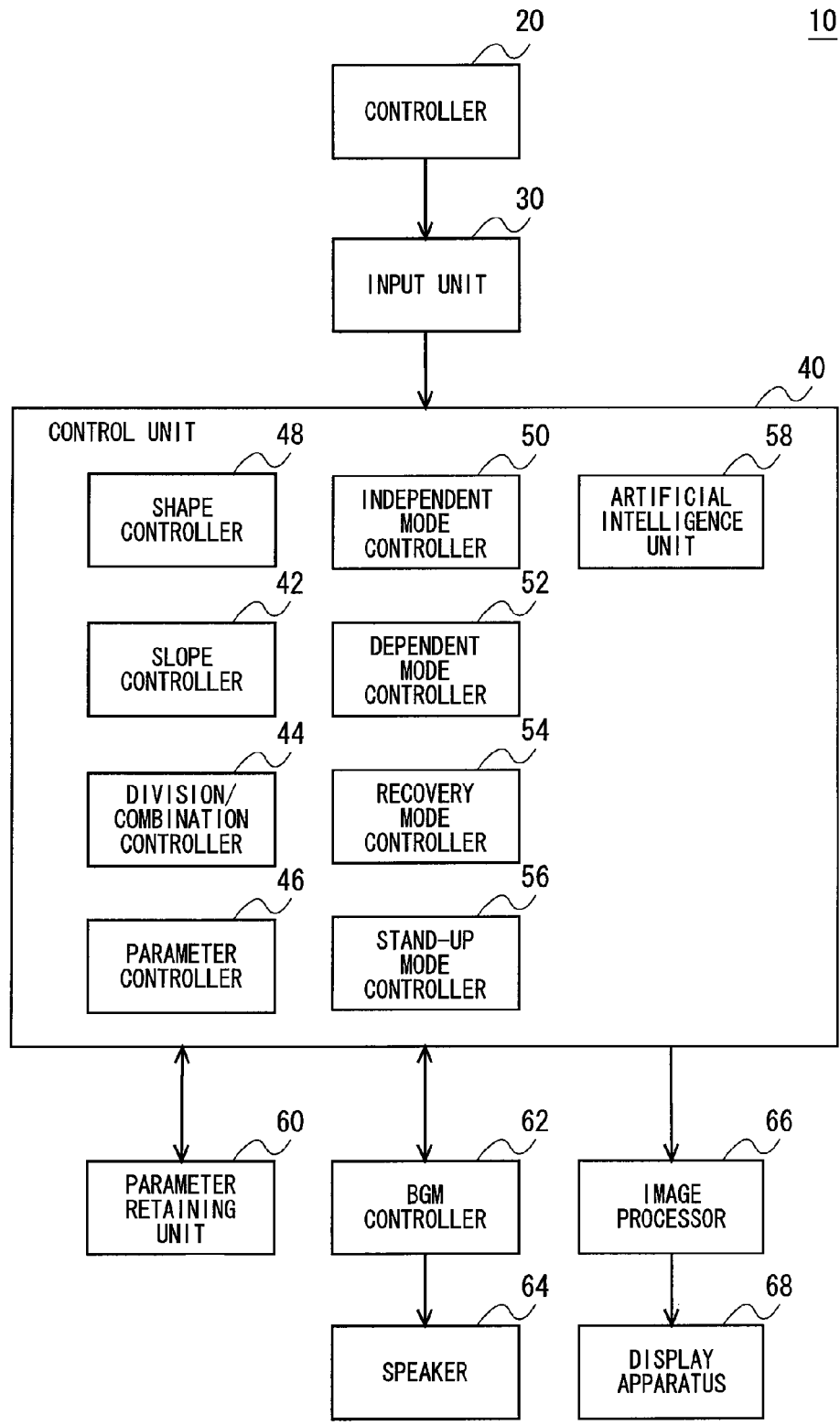
FIG. 1 is a diagram that shows a configuration of a game device according to an embodiment.

EXPLANATION OF REFERENCE NUMERALS 10 game device
20 controller
30 input unit
40 control unit
42 slope controller
44 division/combination controller
46 parameter controller
48 shape controller
50 independent mode controller
52 dependent mode controller
54 recovery mode controller
56 stand-up mode controller
58 artificial intelligence unit
60 parameter retaining unit
62 BGM controller
64 speaker
66 image processor
68 display apparatus

BEST MODE FOR CARRYING OUT THE INVENTION

A game device according to an embodiment of the present invention provides a game in which a player tilts the ground beneath a character in a game field, which includes terrain having difference of elevation, so as to roll the character in a desired direction to lead it to the goal point. The character not only moves passively by being rolled by the slope of the ground, but also moves actively with its own intellect by means of artificial intelligence. The player indirectly controls the character acting autonomously by manipulating the slope of the ground, so as to advance toward the goal in cooperation with the character.

When a character acquires a character-increasing item placed on the field, the number of characters increases. A character that newly appears there is not the one for standing by outside the game field as a replacement in the event that the original character is defeated; those multiple characters appear in the game field combinedly or separately and advance toward the goal together. If a single character encounters an attack from an enemy character or hits an obstacle such as a pricker, the character will die at the time. However, if a combined character is damaged, the character will be divided upon the damage. As more characters are combined to be made larger, the body is more likely to hit an obstacle or the like, so that the operation will be more difficult. The purpose of the game is to lead as many characters as possible to the goal, and the larger the number of characters that have reached the goal is, the greater the reward given to the player becomes.

Multiple characters can be combined and operated as a single character, or can be operated as they are separately. The player can divide a combined character to make it pass through a narrow path, which the character cannot go through in the combined state. Conversely, the player can combine characters to make them pass through a hole, which a character with less than a certain weight cannot go through. In such way, the player advances the game by combining or dividing characters suitably.

FIG. 1 shows a configuration of a game device 10 according to an embodiment. The game device 10 comprises a controller 20, an input unit 30, a control unit 40, a parameter retaining unit 60, a BGM controller 62, a speaker 64, an image processor 66, and a display apparatus 68. In terms of hardware components, these unit structures may be realized by a CPU or memory of any given computer, a memory-loaded program, or the like. Here is shown a functional block configuration which is realized by cooperation of such components. Thus, it would be understood by those skilled in the art that these function blocks can be realized in a variety of forms by hardware only, software only or a combination thereof.

The input unit 30 receives a control signal input from the controller 20 operated by a player. The control unit 40 executes a game program according to the user's instruction received by the input unit 30 to advance the game. The parameter retaining unit 60 retains a parameter that represents an attribute of a character. In the present embodiment, a "vitality level" that represents the level of vitality of the character is used as the parameter. A high vitality level means that the character is active and in high spirits. Also, characters having high vitality levels tend to gather and act together. Accordingly, even when a player operates multiple characters in such condition, the characters are unlikely to act separately, thereby facilitating the player's operation. The BGM controller produces BGM (Background Music) to be played during the progression of the game, and outputs the music to the speaker 64. The image processor 66 generates a game screen to be controlled by the control unit 40, and displays the screen on the display apparatus 68. The operation in each of the components will be described in detail later.

FIG. 2 is a diagram that shows the overview of the game. FIG. 2A illustrates the state where a character acts autonomously. In the example of FIG. 2A, the character has found a butterfly flying and is jumping around to follow the butterfly. Such "independent mode", in which the character independently acts with its own intellect, is controlled by an independent mode controller 50. The character's intellect in the independent mode is simulated by an artificial intelligence unit 58.

Figure 2A:
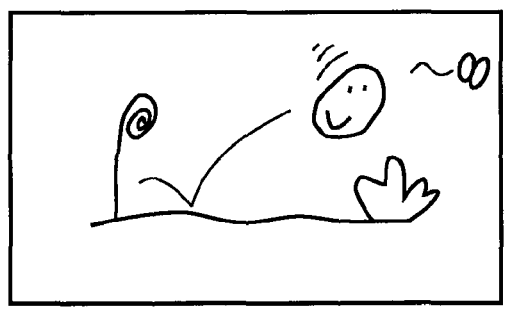
FIG. 2 is a diagram that shows the overview of a game.
Figure 2B:
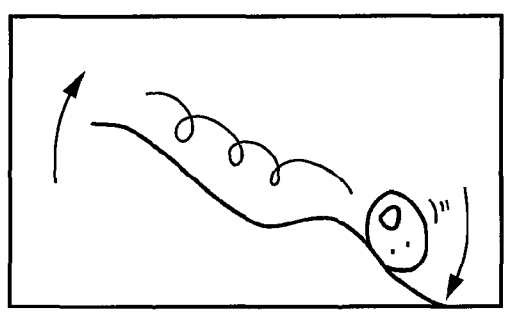

FIG. 2B illustrates the state where the player has tilted the ground beneath a character. When the player tilts the ground clockwise using the controller 20, the character rolls along the slope from left to right on the screen. Such "dependent mode", in which the character cannot resist and rolls down the slope of the ground, is controlled by a dependent mode controller 52. A slope controller 42 receives the player's operation for tilting the ground via the controller 20, and controls the inclination of the ground. The dependent mode controller 52 performs physical calculation based on the inclination of the ground, and provides control such that the character rolls down. Thus, the player indirectly operates the character moving around freely in the independent mode, by tilting the ground.

Figure 2C:
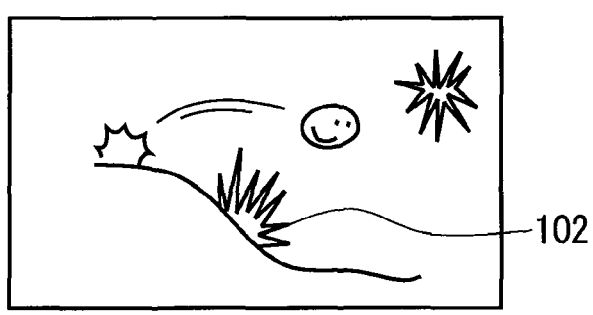

FIG. 2C illustrates the state where the player has flicked a character via the ground beneath the character so that the character has jumped. When the player flicks the character via the ground using the controller 20, the character is made to jump. Although the character can jump on its own will in the "independent mode", the character is sometimes made to jump by being flicked by the player, as depicted in FIG. 2C. When the character is flicked and made to jump by the player, the movement of the character is controlled by the dependent mode controller 52. The dependent mode controller 52 performs physical calculation based on the strength of a flick given by the player onto the ground, the inclination of the ground, the frictional force between the ground and the character, etc., so as to provide control such that the character is flicked via the ground and made to jump therefrom. When there is an obstacle on the ground, such as a pricker 102, the player can indirectly operates the character by flicking the ground so as to make the character jump to dodge the obstacle.

Figure 2D:
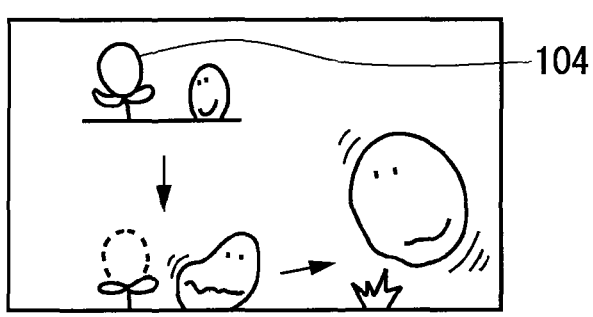

FIG. 2D illustrates the state where the player has acquired a character-increasing item. Upon eating a character-increasing item of a fruit 104, the character has increased in number and then the body thereof has become larger. In this way, although multiple characters are combined into a single character in FIG. 2D, the characters may be also operated separately, as will be described later.

Figure 2E:
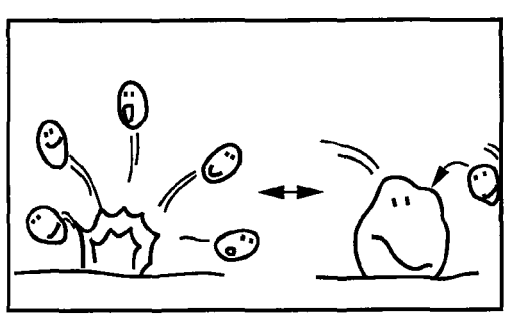

FIG. 2E illustrates the state where characters are divided or combined. When the number of characters increases and there exist two or more characters, the player can combine or divide the characters. The division or combination of characters is controlled by a division/combination controller 44. The player can give an instruction via the controller 20 to divide or combine characters, or characters may sometimes divide or combine on their own will. When a combined character receives impact above a certain level, such as when hitting a pricker 102 or falling down from a height, some bodies are separated from the character. The number of bodies separated therefrom is determined by the division/combination controller 44 according to the number of the characters combined or the vitality level of the character at the time.

Figure 3:
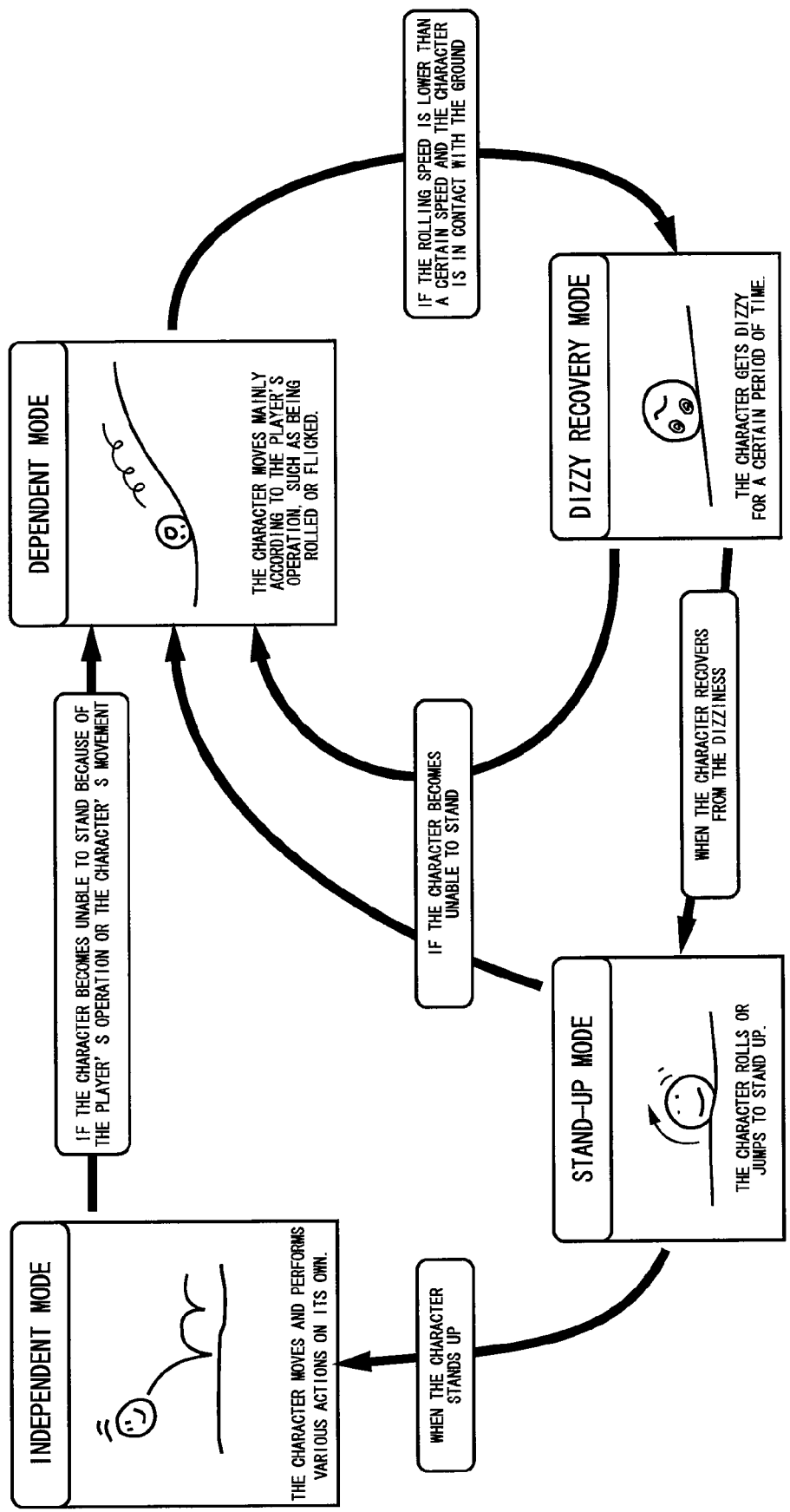
FIG. 3 is a diagram that shows transitions among operation modes of a character.

FIG. 3 shows transitions among operation modes of a character. A character has four operation modes: the independent mode in which the character acts on its own; the dependent mode in which the character acts mainly according to the player's operation, such as rolling along the slope of the ground or being flicked via the ground and made to jump; the recovery mode in which the character gets dizzy after rolling and is unable to stand up; and the stand-up mode in which the character has recovered from the recovery mode and stands up.

In the independent mode, the independent mode controller 50 allows the character to move as determined by the artificial intelligence unit 58. The artificial intelligence unit 58 determines the action of the character based on the vitality level retained in the parameter retaining unit 60. If the inclination of the ground beneath the character exceeds a certain angle in the independent mode because of the player's operation or the character's independent move, the mode will change to the dependent mode and the character will begin to roll down the slope. More specifically, considering the center of gravity of the character's body as the center, the range of 120 degrees in the lower part of the character's body is regarded as the feet of the character. When the character stands at an angle of 45 degrees or less with respect to the normal line of the ground, the character acts in the independent mode. When the angle exceeds 45 degrees, the mode changes to the dependent mode. Also when the character is flicked via the ground by the player's operation and made to jump, the mode changes to the dependent mode. The dependent mode controller 52 makes the character roll according to physical calculation based on the inclination of the ground and the character's own weight. The dependent mode controller 52 also makes the character jump according to physical calculation based on the strength of a flick given onto the ground and the character's own weight.

If the speed of the character's rolling down is lower than a certain speed and the character is in contact with the ground in the dependent mode, the mode will change to the recovery mode in which the character gets dizzy and is unable to stand up until a certain period of time elapses. A recovery mode controller 54 measures the length of time that has elapsed since the recovery mode started, and, when the certain period of time elapses, the recovery mode controller 54 changes the mode to the stand-up mode.

In the stand-up mode, a stand-up mode controller 56 makes the character stand up. If there is a space around the character where the character can roll to stand up, the stand-up mode controller 56 determines the rolling direction in which the character can stand up quickly, and makes the character roll in such direction. If the character rolls in the rolling direction in which the character can stand up quickly but the character then hits an obstacle and becomes unable to roll any further, the stand-up mode controller 56 will make the character roll in the opposite direction. If the character cannot roll in any directions, the stand-up mode controller 56 will make the character jump up and roll in midair to stand the character up. When the character stands up, the mode changes to the independent mode.

If the inclination of the ground exceeds a certain angle or if the character is flicked via the ground during the recovery mode or stand-up mode, the mode will change to the dependent mode again.

Referring back now to FIG. 1, the description of each component will be continued. A parameter controller 46 modifies the character's vitality level retained in the parameter retaining unit 60, based on the character's action, the ambient environment, or the occurrence of an event. The parameter controller 46 lowers the character's vitality level retained in the parameter retaining unit 60 when the character touches an obstacle such as a pricker, when the character is bitten by an enemy character, or when the character touches another character that lowers the vitality level. Conversely, the parameter controller 46 increases the vitality level retained in the parameter retaining unit 60 when the character acquires an item such as a fruit, when the character defeats an enemy character, when the character finds a place where an event is initiated, or when the character is rolled at high speed. The vitality level is a parameter that represents the state of the character, and it is used by the artificial intelligence unit 58 to determine the character's action, or by the division/combination controller 44 to determine the division or combination of the characters.

The artificial intelligence unit 58 reads the character's vitality level from the parameter retaining unit 60 in the independent mode to determine the character's action according to the vitality level. When there are multiple characters that are separated, the action of each of the characters is determined by the artificial intelligence unit 58 independently. When multiple characters are combined, one of the characters included in the combined one acts on behalf of the characters.

When the vitality levels of characters are high, the artificial intelligence unit 58 preferentially selects a joyful and merry action for them, such as gathering friends to act together, piling up on each other, or singing songs together. The artificial intelligence unit 58 also allows such characters to perform actions advantageous to the progression of the game, such as moving agilely or uniting to act together. When the vitality levels of characters are low, the artificial intelligence unit 58 preferentially selects such an action as arguing or allowing a character to throw itself against another character.

When divided characters freely act and disperse away from each other, it is hard for the player to operate the characters. When the characters have high vitality levels and tend to gather to act together, on the other hand, it is easy for the player to operate the characters, so that the player may be able to lead many characters to the goal. Thus, the character's vitality level affects the difficulty level of the game; in other words, the difficulty level of the game can be adjusted by adjusting the vitality level. When the vitality level reaches the maximum, the artificial intelligence unit 58 may make the character invincible for a certain period of time, during which the character does not get damaged by obstacles and can defeat enemy characters only by hitting against them.

When a character finds a place where an item is hidden or a wall that the character can pass through, the artificial intelligence unit 58 may allow the character to act in a manner providing a clue to the player, such as getting close to the place or wall on its own or speculating about it curiously. Also, in a place where the operation cannot be provided easily, such as an ascending slope with prickers on the ceiling, the artificial intelligence unit 58 may allow the character to act in a manner helping the player's operation, such as climbing up the slope on its own will when the operation is left to the character. In this manner, the character's action can be adjusted suitably so as to adjust the difficulty level of the game. For example, a course with a high difficulty level may be set for experienced players, whereas a course may be set for beginners who cannot advance the game, in which the character is allowed to proceed along the course on its own. This enables a game that a wide range of players can enjoy.

When characters get close to a place where an event is to be initiated, the artificial intelligence unit 58 may allow the characters to be automatically located in the respective positions and to perform such actions as singing together or doing the Wave. In such case, a certain reward may be given for the completion of the event. The reward may be given according to the number of characters. Also, the event may be set not to occur unless the number of characters exceeds a certain number.

In the game field, there appear enemy characters that attack the player's character, and ally characters that protect or move the player's character, or give a clue to the player. These characters are also controlled by the artificial intelligence unit 58 and act autonomously.

Figure 4:
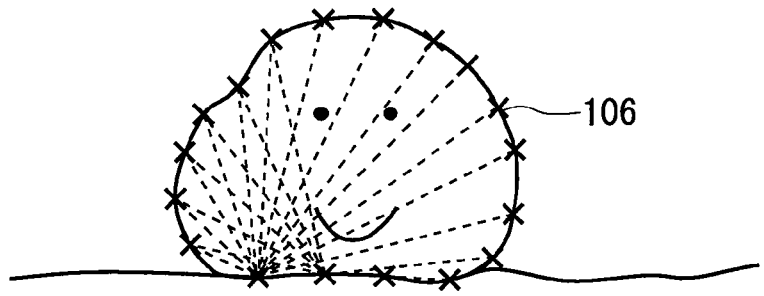
FIG. 4 is a diagram that shows control points for controlling the shape of a character.

A shape controller 48 computes the shape of the character's body based on physical calculation. The shape controller 48 provides the outline of the character's body by connecting a given number, 32 for example, of control points 106, as depicted in FIG. 4. The shape controller 48 connects the control points 106 respectively by means of virtual springs, and computes the position of the respective control points 106 based on the elastic force of the springs, thereby providing a jelly-like texture to the character. The softness of the shape of the character's body can be changed by adjusting the spring constants of the virtual springs connecting the control points 106. For example, when a character is rolling down the slope in the dependent mode and the rolling speed is increasing, the springs may be hardened to help the character roll down easily. This enables the character to accelerate readily, thereby improving the operability. Also, when it is needed to flick a character to make it jump, the springs may be softened to help the character be flicked easily. Thus, the hardness of the character's body can be adjusted by adjusting the spring constants, thereby changing the operability or difficulty level of the game. Also, the jelly-like texture of the character may provide a sense of "healing" to the player. In addition, various gimmicks arranged on the game field may be set to move in a wavy manner, based on physical calculation.

The slope controller 42 receives an operation instruction from the player via the controller 20, and controls the inclination of the ground in the game field. For instance, the operation of moving down the right side of the screen may be assigned to a button located on the right side of the controller 20, and the operation of moving down the left side of the screen may be assigned to a button located on the left side of the controller 20. Accordingly, the slope controller 42 can receive an operation instruction for tilting the ground, which is provided by intuitive and easily understood operation. Also, the controller 20 may be provided with a sensor that detects the tilting of the controller 20. In such case, the slope controller 42 may receive an operation instruction for tilting the ground, which is provided by tilting the controller 20, and may reflect the instruction in the game field.

Figure 5:
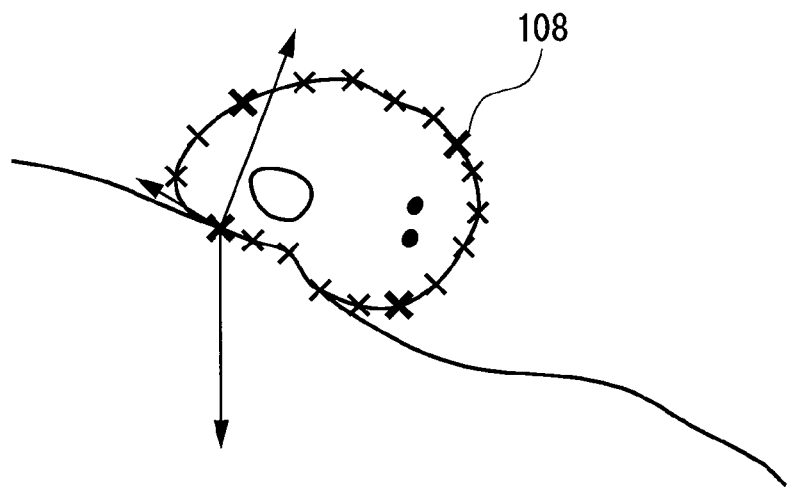
FIG. 5 is a diagram that shows control points for controlling the rolling of a character.

The slope controller 42 computes the current inclination of the ground and notifies the dependent mode controller 52 thereof. The slope controller 42 may tilt only the ground beneath the character, or may tilt the whole game field. The dependent mode controller 52 provides control such that the character rolls down the slope when the inclination exceeds a certain angle, such as 45 degrees. As depicted in FIG. 5, the dependent mode controller 52 extracts, for example, four control points 108 from among the control points 106 of the character. Then, the dependent mode controller 52 applies to each of the four points the gravitational force caused by the character's own weight, the normal force from the ground surface, and the kinetic frictional force between the ground surface and the character, so as to perform physical calculation to compute a velocity vector. This can provide a situation in which the character rolls down the slope. Also, when the coefficient of kinetic friction between the ground surface and the character is set small, a situation can be provided in which the character slides down the slope. As the inclination of the ground becomes smaller, the character's speed becomes lower because of the frictional force between the ground surface and the character. If the character's speed then falls below a certain speed, the mode will change to the recovery mode.

The division/combination controller 44 controls the division and combination of characters. As stated previously, when a character acquires a character-increasing item or the like, the number of characters increases. Multiple characters can be combined to act as a single character, or can be separated to act independently. When receiving an operation instruction of division or combination from the player via the controller 20, the division/combination controller 44 divides or combines the characters accordingly. When characters are combined, it is considered as a single character and the movement thereof is controlled by the independent mode controller 50, the dependent mode controller 52, the recovery mode controller 54, or the stand-up mode controller 56. When characters are separated, each of the characters is controlled independently.

In some cases, the division/combination controller 44 divides or combines characters without an explicit operation instruction from the player. For instance, when a combined character is attacked by an enemy character or touches an obstacle such as a pricker, the division/combination controller 44 separates some of the characters from the combined body according to the damage level. In this process, the division/combination controller 44 may refer to the vitality level retained in the parameter retaining unit 60, so as to provide control such that many characters are separated from the combined body when the vitality level is low. Accordingly, the division/combination controller 44 provides control such that many characters are separated by small damage when the character's vitality level is low. Conversely, when the character's vitality level is high, the division/combination controller 44 provides control such that the characters are not separated easily.

The BGM controller 62 controls the reproduction of BGM that is played during the progression of the game. The BGM controller 62 retains BGM containing multiple parts and assigns each of the parts to the respective characters currently present, so as to reproduce the parts equal in number to the characters. This can provide a scene in which multiple characters are singing in chorus. When there is only one character, one of the parts may be assigned to it so as to provide a scene in which the character sings solo. The BGM controller 62 may change the BGM according to the character's vitality level. For example, when the character's vitality level is high, joyful BGM in a major key may be reproduced, whereas, when the character's vitality level is low, plaintive BGM in a minor key may be reproduced. When playing BGM in which multiple characters sing in chorus, an instruction may be given to the division/combination controller 44 to divide a combined character automatically, so as to provide a situation in which the separate characters sing in chorus. Also, it may be set that a chorus does not begin, that is, BGM is not reproduced, unless there are more than a certain number of characters.

Figure 6:
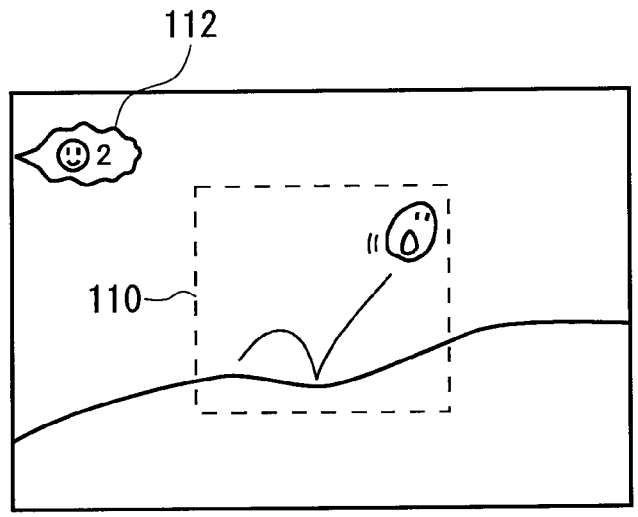
FIG. 6 is a diagram that shows an example of a screen of a game field.

The image processor 66 generates a screen of the game field in accordance with the character's movement. FIG. 6 shows an example of a screen of the game field. When the center of a character, if there is only one character, or the center of gravity of characters, if there are multiple separate characters, is about to deviate from an area 110 defined near the center of the screen displaying the game field, the image processor 66 automatically scrolls the screen in the deviating direction. Thus, the screen is automatically scrolled in the direction where the character moves, thereby providing the improved operability to the player. The size of the area 110 may be, for example, about one third of the whole screen in the horizontal direction and about a half of the whole screen in the vertical direction.

When the number of characters increases, the image processor 66 may broaden the game field to be displayed by allowing the camera to zoom out automatically. As the number of characters increases, they are more likely to disperse in a wider area when they act separately. Therefore, by providing a wider display area in advance, improved operability will be provided to the player.

If multiple separate characters become apart from each other by more than a certain distance while the center of gravity of the characters is set as the center of the screen, it will be difficult for the player to operate the characters because some of the characters are present in the peripheral part of the display screen. Accordingly, in such case, characters far apart from each other are managed as different groups, and the screen is generated in such a manner that the center of gravity of one group, for example a group having a greater number of characters, is set as the center of the screen. When an operation instruction for changing the target group is given by the player via the controller 20, the screen may be scrolled to display the other group, setting the center of gravity of the group as the center of the screen.

When there is a character outside the screen generated by the image processor 66, the image processor 66 displays a balloon 112 for indicating that there is a character in such a manner that the balloon points to the direction of the character outside the screen. In the example of FIG. 6, there are two characters not displayed on the screen, to the left of the screen. When a certain period of time elapses since a character gets left outside the screen, the control unit 40 may vanish the character. When the player learns, from the balloon 112, that two characters are left out of the screen on the left, the player may, for example, tilt the ground counterclockwise to move another character displayed on the screen to the left, so as to meet the characters left out of the screen to prevent them from vanishing.

As described above, here is employed a simple and easy-to-understand rule of rolling the character to the goal by tilting the ground, which is reminiscent of an old game in which the player rolls a coin. This can provide a friendly game that is accepted by a wide range of people. In addition, there is added a completely new idea of indirectly operating a character that moves around freely, thereby providing originality that keeps players from being bored. Furthermore, the characters moving around merrily in a group are fun to watch, and various effects such as allowing the characters to sing BGM in chorus can provide enhanced entertainment capabilities.

The present invention has been described with reference to the embodiment. The embodiment is intended to be illustrative only and it will be obvious to those skilled in the art that various modifications to constituting elements or processes could be developed and that such modifications also fall within the scope of the present invention.

INDUSTRIAL APPLICABILITY

The present invention is applicable to a game device for controlling a game in which a character is moved and led to the goal.

The invention claimed is:

1. A game device comprising:
an image processor that generates a simulated game field in which a character moves, the game field having simulated obstacles that the character can surmount by combining with other characters to form a single combined character or by dividing to form a plurality of characters;
an artificial intelligence unit which controls an action of the character;
a user interface which receives an operation input for tilting the game field including the ground on which the character is placed;
a slope controller which controls the slope of the ground based upon the operation input that the user interface has received;
a character controller which moves the character based upon the inclination of the ground controlled by the slope controller; and
a combination and division controller which, when there are a plurality of the characters, controls the combination and division of the characters;
wherein the character controller includes:
an independent mode controller which controls the character so that the character performs an action determined by the artificial intelligence unit, when the inclination of the ground is smaller than a predetermined value; and
a dependent mode controller which controls the character so that the character rolls on the ground, when the inclination of the ground is greater than or equal to the predetermined value;
wherein the simulated game field includes terrain having differences in elevation and wherein the character is lead to a certain goal point in the game field by tilting the ground on which the character is placed;
wherein the simulated game field defines a hole therein such that: (i) if the character has at least a certain weight, the character can pass through the hole in the simulated game field, and (ii) if the character has less than the certain weight, the character cannot pass through the hole in the simulated game field.

2. A game control method comprising:
generating, by a processor-based apparatus, a simulated game field in which a character moves, the game field having simulated obstacles that the character can surmount by combining with other characters to form a single combined character or by dividing to form a plurality of characters;
receiving an operation input for tilting a game field and controlling the slope angle of the game field based upon the received operation input;
controlling a character so that the character performs an action determined by artificial intelligence which simulates the character's intellect, when the inclination of the game field is smaller than a predetermined value;
controlling the character so that the character rolls on the game field according to physical calculation, when the inclination of the game field is greater than or equal to the predetermined value; and
controlling, when there are a plurality of the characters, the combination and division of the characters;
wherein the simulated game field includes terrain having differences in elevation and wherein the character is lead to a certain goal point in the game field by tilting the ground on which the character is placed;
wherein the simulated game field defines a hole therein such that: (i) if the character has at least a certain weight, the character can pass through the hole in the simulated game field, and (ii) if the character has less than the certain weight, the character cannot pass through the hole in the simulated game field.

3. A non-transitory computer-readable recording medium storing a computer program product comprising:
an image processor that generates a simulated game field in which a character moves, the game field having simulated obstacles that the character can surmount by combining with other characters to form a single combined character or by dividing to form a plurality of characters;
a slope control module which receives an operation input for tilting the whole game field including the ground on which a character is placed, and controls the slope of the ground based upon the received operation input;
an independent mode control module which controls the character so that the character performs an action determined by artificial intelligence which simulates the character's intellect, when the inclination of the ground is smaller than a predetermined value;
a dependent mode control module which controls the character so that the character rolls or slides on the ground according to physical calculation, when the inclination of the ground is greater than or equal to the predetermined value; and
a combination and division control module which, when there are a plurality of the characters, controls the combination and division of the characters;
wherein the simulated game field includes terrain having differences in elevation and wherein the character is lead to a certain goal point in the game field by tilting the ground on which the character is placed;
wherein the simulated game field defines a hole therein such that: (i) if the character has at least a certain weight, the character can pass through the hole in the simulated game field, and (ii) if the character has less than the certain weight, the character cannot pass through the hole in the simulated game field.

4. A computer program product, comprising:
an image processor that generates a simulated game field in which a character moves, the game field having simulated obstacles that the character can surmount by combining with other characters to form a single combined character or by dividing to form a plurality of characters;
a slope control module which receives an operation input for tilting the game field including the ground on which a character is placed, and controls the slope of the ground based upon the received operation input;
an independent mode control module which controls the character so that the character performs an action determined by artificial intelligence which simulates the character's intellect, when the inclination of the ground is smaller than a predetermined value;

a dependent mode control module which controls the character so that the character rolls or slides on the ground according to physical calculation, when the inclination of the ground is greater than or equal to the predetermined value; and a combination and division control module which, when there are a plurality of the characters, controls the combination and division of the characters;

wherein the simulated game field includes terrain having differences in elevation and wherein the character is lead to a certain goal point in the game field by tilting the ground on which the character is placed;

wherein the simulated game field defines a hole therein such that: (i) if the character has at least a certain weight, the character can pass through the hole in the simulated game field, and (ii) if the character has less than the certain weight, the character cannot pass through the hole in the simulated game field.

\* \* \* \* \*